United States Patent Office 2,933,652
Patented Apr. 19, 1960

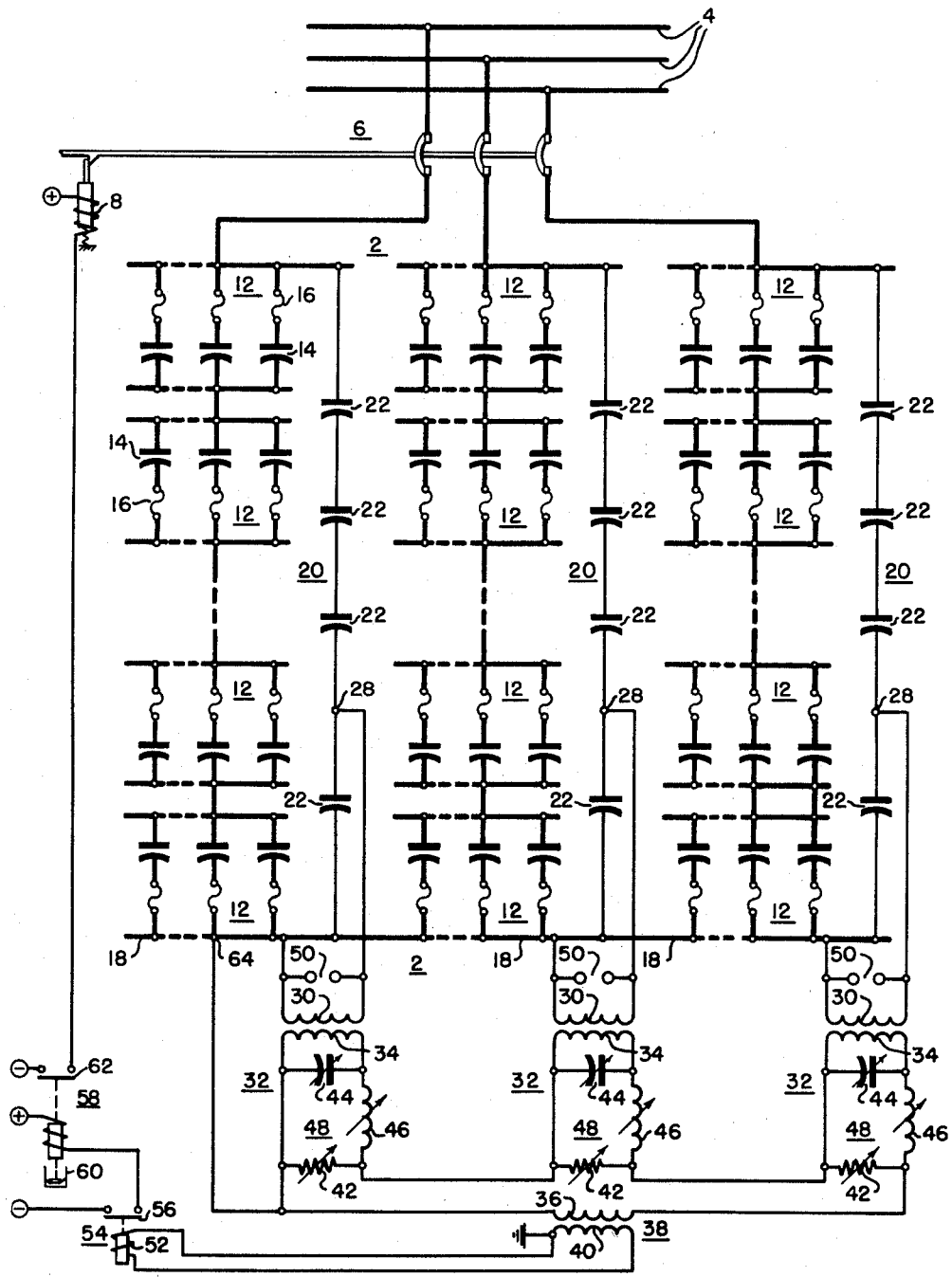

2,933,652

SHUNT CAPACITOR BANK

William H. Cuttino, Wilkinsburg, Pa., assignor to Westinghouse Electric Corporation, East Pittsburgh, Pa., a corporation of Pennsylvania Application June 8, 1956, Serial No. 590,136

4 Claims. (Cl. 317—12)

The present invention relates to shunt capacitor banks for alternating current transmission and distribution lines, and it relates more particularly to the protection of large, high-voltage shunt capacitor banks against damage resulting from failure of individual capacitors.

Capacitors are frequently connected in shunt to alternating current transmission and distribution lines for the purpose of improving the power factor. When a relatively large amount of capacitance is required, the usual arrangement is to utilize the necessary number of relatively small capacitors of standard kvar. and voltage ratings, connected together in a bank in a suitable series parallel arrangement, since it makes the most effective use of the dielectric material, and permits the use of standard capactiors of relatively low cost.

When a large number of capacitors is connected in a bank in this manner, the possibility of dielectric failure in one or more of the capacitors is always present, and if a faulted capacitor is not immediately removed from the circuit, the arc which occurs within the capacitor is likely to rupture the capacitor case, resulting in damage to adjacent good capacitors. For this reason, it is customary to provide an individual fuse connected in series with each capacitor so that if a capacitor fails, its fuse will immediately blow and disconnect it from the bank.

In the usual arrangement of large, high-voltage capacitor banks, the capacitors are connected in groups, each group consisting of a plurality of capacitors connected in parallel, and a number of such groups is connected in series. If a fuse blows on one or more of the capacitors in one of these groups of paralleled capacitors, the impedance of that group is increased and the voltage no longer divides equally among the series-connected groups but increases on the group containing the faulted capacitor. Standard capacitors are designed for continuous operation at a voltage not exceeding 110% of the rated voltage, and if an overvoltage of more than 10% occurs on a group of capacitors because of failure of one or more of them, the remaining capacitors are endangered by the overvoltage. It is necessary, therefore, to provide some protective system which will prevent a continuous overvoltage of more than 10%.

One protective system which has been used on three-phase capacitor banks utilizes potential transformers connected across each phase of the bank to measure the phase voltages, with the secondaries of the transformers connected to a relay in such a manner that the relay responds to the zero sequence voltage. As long as the phase impedances of the capacitor bank are equal, the zero sequence voltage will be zero and the relay will not be energized. If the impedances of the phases become unequal due to failure of capacitors in one phase, the phase voltages are unbalanced and the relay is operated by the zero sequence voltage to trip the circuit breaker and disconnect the bank from the line.

In high voltage capacitor banks, however, this system has certain serious practical disadvantages. The manufacturing tolerances for capacitance in standard capacitors are such that there is usually some slight difference in the impedance of the phases of a three-phase capacitor bank, and the sensitivity of the relay must, therefore, be such that it will not operate in response to the small amount of unbalance in the voltages resulting from this slight difference in phase impedance.

This has been a serious disadvantage in the above-described system because it makes it necessary to closely balance the phases of the capacitor bank in order to be able to detect fuse operations in a group which would result in excessive operating overvoltage. Because of variations in the capacitance of individual capacitors due to manufacturing tolerances, this is an expensive and time consuming operation, since the capacitance of each capacitor varies and a random positioning of capacitors in the bank will result in somewhat different impedances in each phase. To properly balance the phases, therefore, necessitates considerable testing and interchanging of the capacitor units.

The high cost of three high-voltage potential transformers plus a high voltage resistor in the primary of each transformer, to reduce the capacitor discharge current to a value which will not damage the transformer when the capacitor is switched off, is another serious disadvantage to this system. When switching the capacitor off, occasional restriking may occur in the circuit breaker which can result in overvoltages on the capacitor up to 2½ times normal line-to-ground value. When capacitors are charged to voltages of this magnitude, the transient discharge current that will flow in the potential transformer primary results in sufficient force to damage the winding unless a resistor is added to limit the current to a safe value.

The principal object of the present invention is to provide a high voltage Y-connected shunt capacitor bank which is adequately protected against overvoltage on any group of parallel capacitors resulting from failure of one or more capacitor units.

Another object of the invention is to provide a high voltage Y-connected shunt capacitor bank having overvoltage protective means which utilize relatively low voltage potential devices for energizing a relay to respond to the vector sum of the output voltages of the potential devices, so as to be responsive to voltage unbalance resulting from the blowing of individual capacitor fuses.

A further object of the invention is to provide a high voltage shunt capacitor bank having protective means which eliminate the necessity and expense of close balancing of the capacitor bank in the field.

Other objects and advantages of the invention will be apparent from the following detailed description, taken in connection with the accompanying drawing, the single figure of which is a schematic drawing showing a preferred embodiment of the invention.

The invention is shown in the drawing applied to a three-phase Y-connected shunt capacitor bank 2 which is connected to a three-phase alternating current line 4 by means of a circuit breaker 6 of any suitable type. The circuit breaker 6 is shown as having a trip coil 8 for effecting opening of the breaker and may be actuated to closed position manually or by any suitable means. The capacitor bank 2 is a high voltage, three-phase Y-connected bank. The three phases of the bank are identical, and each phase is provided with the same protective means, so that only one phase need be described in detail. Each phase of the capacitor bank 2 comprises a plurality of groups 12 of capacitors 14 connected in series, each group including a plurality of capacitors 14 connected in parallel. Each capacitor 14 has an individual fuse 16 connected in series with it.

One end of each phase of the capacitor bank 2 is connected to the line 4 by the circuit breaker 6 and the other end of each phase is connected to the neutral conductor 18.

An auxiliary capacitor 20 is connected across each phase between line 4 and the neutral conductor 18. The auxiliary capacitor 20 may be of the type usually used as a coupling capacitor and consists of a series of individual capacitor units 22 connected together in series. The primary winding 30 of a voltage measuring network or potential device 32 is connected between a tap connection 28 in the auxiliary capacitor 20 and the neutral conductor 18 of the capacitor bank 2 to respond to the voltage across a portion of the auxiliary capacitor 20. The output terminals of the potential devices 32 are connected in series with the primary winding 36 of an insulating transformer 38 whose secondary winding 40 is used to energize a relay for detecting capacitance unbalance. The potential devices 32 may be of any suitable type which provides for adjustment of the output voltage. In the preferred embodiment shown in the drawing, each potential device 32 includes a primary winding 30 and a secondary winding 34, and a variable resistance 42, capacitance 44 and inductance 46 are included in an output network 48 to provide for adjustment of the output voltage. Since the output voltage of each potential device 32 may be separately adjusted, the output voltages may be adjusted to compensate for any shift in neutral voltage of the capacitor bank due to initial capacitance unbalance so that the vector sum of the output voltages, or zero sequence voltage, will be substantially zero initially. A protective gap 50 is connected across the primary 30 of each potential device 32 to prevent excessive voltage from being impressed on the capacitors 22 and potential device windings 30 and 34. These excessive voltages may be caused by overload or short circuit on the potential device 32 or by impulse surges on the line 4.

In the preferred embodiment illustrated in the drawing, the secondary winding 40 of the insulating transformer 38 is connected to the operating coil 52 of a relay 54 which operates instantaneously when the vector sum of the voltage measuring network output voltages exceeds the pickup voltage for which the relay is adjusted. The contact 56 of the relay is connected in the energizing circuit of a time delay relay 58, which may be any suitable source of low voltage control power, so that when relay 54 closes its contact the time delay relay 58 operates. Any suitable type time delay relay may be used. It is indicated diagrammatically in the drawing by dashpot 60. The relay 58 has a contact 62 which is connected in a control circuit for the trip coil 8 of the circuit breaker 6 so that when the relay 58 closes its contact, the trip coil 8 is energized and the circuit breaker 6 opens to disconnect the capacitor bank 2 from the line. The time delay 58 is desirable to avoid unnecessary operation of the circuit breaker 6 due to momentary non-simultaneous closing of the three breaker poles during a closing operation, or momentary voltage changes occurring during the blowing of an individual fuse 16 or faults on the line 4. The instantaneous relay 54 might be eliminated if desired and the time delay relay 58 energized directly by the vector sum of the voltages across either the secondary winding 40 of the insulating transformer 38 or, alternatively, the relay coil might be connected directly in series with the output terminals of the potential devices 32.

The relays may be connected to effect any desired response to overvoltage in one or more groups of capacitors. As shown in the drawing, the relays are connected to operate the circuit breaker 6. They may also be connected to energize signal lamps or an audible signal, if desired, in addition to or instead of actuating the breaker.

The primary winding 36 of insulating transformer 38 may have a connection as at 64 to the neutral conductor 18 of the capacitor bank 2 to provide a direct path to the high voltage winding 36 avoiding the possibility of any sparking in the potential device secondary network due to capacitance effects between the primary and secondary windings 30 and 34 of the potential device in event of lightning or switching surges on line 4. The secondary winding 40 of transformer 38 may be grounded if desired.

The operation of this system is as follows. Under normal conditions with all the capacitor units 14 of each phase connected to the line, and with the capacitance precisely balanced, the vector sum of the output voltages of the voltage measuring networks 32 will be zero and no voltage will be impressed on relay coil 52 of relay 54. Simple adjustments on the secondary networks 48 of the potential devices 32 can be made to compensate for initial capacitance unbalance due to manufacturing tolerances, thus obtaining the effect of perfectly balanced phase capacitance without the necessity of considerable testing and interchanging of capacitor units that might otherwise be required. If one or more of the parallel connected capacitors in one of the groups 12 should fail, causing its fuse to blow and disconnect it from the bank, the impedance of that group will be increased and the resultant impedance of the phase in which it is connected will be changed so that the voltages across the three phases become unbalanced. When the voltages become unbalanced, a net voltage appears across the primary winding 36 of transformer 38. When this net voltage exceeds a predetermined value, the relay means is operated to trip the circuit breaker and disconnect the bank from the line.

It should now be apparent that means have been provided for protecting large, high voltage capacitor banks against overvoltages resulting from failure of individual capacitors which is relatively inexpensive, eliminates the need for three expensive high voltage potential transformers used in protective systems which have been used before, and makes unnecessary the time consuming, costly close balancing of phase capacitance formerly required. A specific embodiment of the invention has been shown and described for the purpose of illustration, but it will be apparent that other embdiments and modifications are possible within the scope of the invention.

I claim as my invention:

1. A polyphase star connected capacitor bank adapted to be connected in shunt to a polyphase alternating current line, each phase of said bank comprising a plurality of individual capacitor units, the capacitances of each phase of said bank being nominally equal to the capacitances of each of the other phases, the values of the individual capacitor units varying from the rated capacitance within fixed limits, a voltage measuring network connected across each phase, relay means responsive to the vector sum of the outputs of said networks and variable impedance means connected in the output of said network to compensate for variations in capacitance between phases due to variations in rated capacitance of the individual capacitor units.

2. A polyphase star connected capacitor bank adapted to be connected in shunt to a polyphase alternating current line, each phase of said bank comprising a plurality of individual capacitor units, the capacitances of each phase of said bank being nominally equal to the capacitances of each of the other phases, the values of the individual capacitor units varying from the rated capacitance within fixed limits, a voltage measuring network connected across each phase, relay means responsive to the vector sum of the outputs of said networks, circuit interrupting means between said line and said capacitor bank, said relay means being operative to actuate said circuit interrupting means, and variable impedance means connected in the output of said networks to compensate for variations in capacitance between phases due to variations in rated capacitance of the individual capacitor units.

3. A polyphase star connected capacitor bank adapted to be connected in shunt to a polyphase alternating current line, each phase of said bank comprising a plurality of individual capacitor units, the capacitances of each phase of said bank being nominally equal to the capacitances of each of the other phases, the values of the individual capacitor units varying from the rated capacitance within fixed limits, a plurality of coupling capacitors comprising a plurality of series connected capacitor units, one of said coupling capacitors connected between the line and neutral conductor across each phase, a voltage measuring network connected across a portion of each of said coupling capacitors, relay means responsive to the vector sum of the outputs of said networks, circuit interrupting means between said line and said capacitor, said relay means being operative to actuate said circuit interrupting means, and variable impedance means connected in the outputs of said networks to compensate for variations in capacitance between the phases due to variations in rated capacitance of the individual capacitor units.

4. A polyphase star connected capacitor bank adapted to be connected in shunt to a polyphase alternating current line, each phase of said bank comprising a plurality of individual capacitor units, the capacitances of each phase of said bank being nominally equal to the capacitances of each of the other phases, the values of the individual capacitor units varying from the rated capacitance within fixed limits, a plurality of coupling capacitors comprising a plurality of series connected capacitor units, one of said coupling capacitors connected between the line and neutral conductor across each phase, a voltage measuring network connected across a portion of each of said coupling capacitors, means for adjusting the outputs of said networks to compensate for variations in capacitance between the phases due to variations in rated capacitance of the individual capacitor units, each of said voltage measuring networks having output terminals, an insulating transformer, the primary winding of said insulating transformer being connected in series with said network output terminals, the vector sum of said network output voltages appearing across said primary winding, and a relay energized from said insulating transformer responsive to the vector sum of the output of said networks.

References Cited in the file of this patent

UNITED STATES PATENTS

| | | |
|---|---|---|
| 2,242,950 | Harder | May 20, 1941 |
| 2,292,935 | Gay | Aug. 11, 1942 |
| 2,376,201 | Starr | May 15, 1945 |
| 2,550,119 | Marbury | Apr. 24, 1951 |
| 2,769,131 | Immel | Oct. 30, 1956 |

FOREIGN PATENTS

| | | |
|---|---|---|
| 698,698 | Germany | Nov. 15, 1940 |